United States Patent Office 3,502,703
Patented Mar. 24, 1970

3,502,703
REACTION PRODUCTS OF CHLORIDES OF CERTAIN METALS WITH TRIMETHOXYBOROXINE
Robert C. Wade, Ipswich, Mass., assignor to Ventron Corporation, Beverly, Mass., a corporation of Massachusetts
No Drawing. Continuation-in-part of application Ser. No. 670,419, Sept. 25, 1967. This application Apr. 9, 1969, Ser. No. 814,851
Int. Cl. C07f 7/00, 11/00, 5/00
U.S. Cl. 260—429　　　　　　　　　　　　4 Claims

ABSTRACT OF THE DISCLOSURE

The invention provides products of unknown complex chemical structure having a variety of useful properties as delustering agents for glass surfaces and polymerization catalysts. These products are produced by reacting substantially anhydrous trimethoxyboroxine with a substantially anhydrous chloride of a metal selected from the group consisting of Ti (IV), Zr (IV), Hf (IV), Al (III), Fe (III), Ga (III), In (III), Sb (V), Mo (V), Nb (V), Ta (V), W (VI) and mixtures thereof in a molar ratio of at least about 0.33 mole of trimethoxyboroxine for each mole of the chloride of the selected metal in an inert substantially anhydrous diluent, such as excess trimethoxyboroxine, methylenechloride, chloroform, or carbon tetrachloride, at a temperature between room temperature and about 200° C. until the reaction mixture ceases to give off organic chloride. By removing the volatile material from the reaction mixture by evaporation the product of complex chemical structure may be isolated. These complex compounds are soluble in water, methylenechloride, chloroform, carbon tetrachloride, acetone, and glycol ethers, such as monomethyl ethylene glycol and dimethyl ethylene glycol ethers. When a solution of these complex compounds is applied to glass surfaces, such as glass fabrics, and the solvent evaporated, delustering occurs and a marked water repellency develops.

---

This invention relates to products of complex chemical structure produced by the reaction of trimethoxyboroxine with certain metal chlorides.

This application is a continuation-in-part of my copending application Ser. No. 670,419 filed Sept. 25, 1967 now Patent No. 3,455,976 dated July 15, 1969, which is a continuation-in-part of my copending application Ser. No. 608,250, filed Jan. 10, 1967, now abandoned.

My copending application Ser. No. 670,419, filed Sept. 25, 1967, now Patent No. 3,455,976 dated July 15, 1969 describes the preparation of products of complex chemical structure by reacting a substantially anhydrous borate ester, such as trimethyl borate, triethyl borate, tripropyl borate, tributyl borate, trihexyl borate, trihexylene glycol biborate and tri (m, p) cresyl borate, with a substantially anhydrous chloride of a metal selected from Ti (IV), Zr (IV), Hf (IV), Al (III), Fe (III), Mo (V), Sn (IV), Ta (V), and W (VI) in a molar ratio of at least about 0.33 mole of borate ester for each mole of the chloride of the selected metal in a substantially anhydrous diluent, such as methylene chloride, chloroform, carbon tetrachloride, or an excess of borate ester, until the reaction mixture ceases to give off organic chloride. When organic chloride ceases to be given off the reaction is essentially complete. By removing volatile material, such as the diluent or excess borate ester, a solid product is obtained which appears to be polymeric in nature and comprises the selected metal, boron, carbon, hydrogen, chlorine, and oxygen.

These complex products of complex chemical structure are soluble in water, methylene chloride, chloroform, carbon tetrachloride, acetone, and glycol ethers, such as monomethyl ethylene glycol and dimethyl ethylene glycol ethers. When a solution thereof is applied to glass surfaces, such as glass fabrics, and the solvent evaporated, delustering occurs and a market water repellency develops. The water repellency can be enhanced by washing in a 1 percent solution of soap, rinsing and drying. These complex products not only have a high affinity for all types of glass but also for certain compounds containing free hydroxyl groups. Thus, they may be used to bind hydroxylic compounds, such as polyvinyl alcohol, to glass surfaces from aqueous or non-aqueous solutions, the glass having previously been coated with the compound of complex chemical structure. When dried the normally water-soluble coating materials are rendered substantially water-insoluble on the surface of the glass. Glass so treated is capable of being dyed with vat dyes or other dyes normally used on cellulose fibers to give full dyeings. These complex products also are useful as polymerization catalysts.

I have now discovered that in addition to the chlorides of the metals previously mentioned I may use the chlorides of Ga (III), In (III) and Sb (V) and also trimethoxyboroxine as the borate ester to produce compounds of complex chemical structure as previously described.

In addition to the inert diluents previously mentioned, these complex reactions may also be carried out in aliphatic hydrocarbons, such as petroleum ether, hexane, heptane, octane, and cyclohexane. However, the reactions proceed more slowly in these diluents and, therefore, are not preferred.

The invention is illustrated further by the following specific examples.

EXAMPLE 1

In this experiment 17.3 grams (0.1 mole) of trimethoxyboroxine was dissolved in 100 grams of methylene chloride and 19 grams (0.1 mole) of $TiCl_4$ added over a period of about 6 minutes. The temperature rose spontaneously about 10° C. Methyl chloride was evolved over a period of about 2 hours. There was finally recovered about 37 grams of yellow solid product which analyzed: Ti=14.9%, B=11.2%, Cl=25.8%, $OCH_3$=22.2%.

EXAMPLE 2

86.5 grams (0.5 mole) of trimethoxyboroxine was dissolved in 200 grams of methylene chloride. To this was added, with stirring, 47.5 grams (0.25 mole) of $TiCl_4$ over a period of about 43 minutes. The reaction mixture was refluxed at 40–43° C. for about two hours. Methyl chloride was evolved during the run. The product was isolated by vacuum evaporation of the methylene chloride. There was recovered 117 grams of yellow solid product. Analysis of the product showed the following: Ti=10.6%, Cl=14.2%, B=14.0%, $OCH_3$=28%.

EXAMPLE 3

0.25 mole of $FeCl_3$ was reacted with 0.25 mole of trimethoxyboroxine in 200 grams of methylene chloride. About 0.25 mole of methyl chloride was evolved. The product was partly soluble in the methylene chloride. The product was recovered by evaporating off the solvent and analyzed. Fe=18.3%, Cl=26.7%, B=9.4%, $OCH_3$=24.3%.

EXAMPLE 4

In this experiment, 0.25 mole $AlCl_3$ was reacted with 0.5 mole of trimethoxyboroxine in 100 grams of methylene chloride. As trimethoxyboroxine was added to the flask containing the $AlCl_3$ and methylene chloride a white solid mass quickly formed. Methyl chloride was evolved and the reaction mass thinned out somewhat. At the end of the addition of the trimethoxyboroxine the entire mass again became very heavy and semi-solid. When cooled from 40° C. to room temperature, the entire mass froze to a glassy solid mass. This was chipped out of the flask and vacuum dried to remove $CH_2Cl_2$. There was recovered about 96 grams of glassy light tan solids, and 17 grams of methyl chloride=0.35 mole. The solid product analyzed is follows: Al=7.1%, B=16.2%, Cl=8.5%, $$OCH_3 = 26.6\%$$

Ratio Al/B=1/6, Al/Cl=1/1, B/$OCH_3$=1.8/1.

When the organic matter of this product is driven off by strongly heating it, there remains a solid polymeric material that can be heated to a bright red heat in air with no evidence of further decomposition or melting. A light sintering does occur.

EXAMPLE 5

The equipment used in this experiment comprised a stirred reaction flask which was fitted with an additional funnel, thermometer, and reflux condenser. The reflux condenser in turn was connected to an empty safety trap, then to a water scrubber and then to a gas meter. 0.25 mole $MoCl_3$ was suspended in 200 grams of methylene chloride in the reaction flask. 0.5 mole trimethoxyboroxine was added to the reaction flask at a controlled rate at room temperature. The temperature rose slightly. The reaction was completed by heating the reaction mixture to about 40° C. until about 0.75 mole of methyl chloride had been given off. The product was recovered by evaporating off the methylene chloride. There was recovered a blue-black granular solid. The product analyzed: Mo=21.0%, Cl=11.1%, B=12.8%, $OCH_3$=16.5%.

The following table summarizes additional examples, all prepared as described in Example 5 above. The methyl chloride was collected in a Dry Ice cooled trap. When the reaction was complete, the low boiling liquids were removed by heating the reaction mixture to about 60° C. under vacuum of about 20 mm. Hg. In each the borate ester used was trimethoxyboroxine.

of Al (III), Fe (III), together with the complex compounds formed thereby.

In my copending application Ser. No. 670,449, filed Sept. 25, 1967, I have claimed methods for producing compounds of unknown complex chemical structure by reacting borate esters, such as trimethyl borate, triethyl borate, tripropyl borate, tributyl trihexyl borate, trihexylene glycol biborate, and tri (m, p) cresyl borate with a chloride of a metal selected from the group consisting of Mo (V), Nb (V), Ta (V) and W (VI), together with the complex compounds formed thereby.

In my copending application Ser. No. 786,447, filed Dec. 23, 1968, I have claimed methods for producing compounds of unknown chemical structure by reacting borate esters, such as trimethyl borate, triethyl borate, tripropyl borate, tributyl borate, trihexyl borate, trihexylene glycol biborate, trimethoxyboroxine, and tri (m, p) cresyl borate with a mixture of at least two chlorides of metals selected from the group consisting of Ti (IV), Zr (IV), Hf (IV), Sn (IV), Al (III), Fe (III), Ga (III), In (III), Mo (V), Ta (V), Nb (V) and W (VI), together with the complex compounds formed thereby.

In my copending application Ser. No. 776,804, filed Nov. 18, 1968, I have claimed methods for producing compounds of unknown complex chemical structure by reacting a borate ester with a chloride of a first metal selected from the group consisting of Ti (IV), Zr (IV), Hf (IV), Sn (IV), Al (III), Fe (III), Ga (III), In (III), Mo (V), Ta (V), Nb (V) and W (VI) in an inert diluent until organic chloride ceases to be given off thereby forming a first liquor comprising said diluent and a compound of unknown complex chemical structure, and then adding to said liquor a chloride of a second selected metal and permitting it to react with said compound thereby forming a second liquor comprising said diluent and a second compound of unknown complex chemical structure. The second compound of complex chemical structure also is claimed in this application.

In my copending application Serial No. 816,829 filed Apr. 16, 1969, I have claimed methods for producing compounds of unknown complex chemical structure by reacting a borate ester with a chloride of a metal selected from the group consisting of Ga (III), In (III), and Sb (V), together with the complex products formed thereby.

I claim:

1. The method which comprises mixing a substantially anhydrous trimethoxyboroxine with a substantially anhy-

| Example | Metal | Chloride (Moles) | Boron Ester (Moles) | Methylene Chloride (Grams) | Methyl Chloride Evolved (Moles) | Product Analysis (percent) | | | | Remarks |
|---|---|---|---|---|---|---|---|---|---|---|
| | | | | | | Metal | Cl | B | $OCH_3$ | |
| | $WCl_5$ | 0.25 | 0.5 | 200 | 0.75 | 29.5 | 11.0 | 10.6 | 16.0 | Product hard yellow insoluble solid (photo chromic). |
| 3 | $NbCl_5$ | 0.25 | 0.5 | 200 | 0.7+ | 22.0 | 12.9 | 12.1 | 21.1 | White solid product. |
| | $TaCl_5$ | 0.25 | 0.5 | 200 | 0.6+ | 31.4 | 13.0 | 9.4 | 18.3 | Off white solid—fluoresces peach-white color under 3,650 A. radiation. |

In my copending application Ser. No. 670,419, filed Sept. 25, 1967, now U.S. Patent No. 3,455,976 dated July 15, 1969, I have claimed methods for producing compounds of unknown complex chemical structure by reacting a borate ester, such as trimethyl borate, triethyl borate, tripropyl borate, tributyl borate, trihexyl borate, trihexylene glycol biborate, and tri (m, p) cresyl borate with a chloride of a metal selected from the group consisting of Ti (IV), Zi (IV), Hf (IV), and Sn (IV) together with the complex compounds formed thereby.

In my copending application Ser. No. 670,450, filed Sept. 25, 1967, now U.S. Patent No. 3,457,289 dated July 22, 1969, I have claimed methods for producing compounds of unknown complex chemical structure by reacting borate esters, such as trimethyl borate, triethyl borate, tripropyl borate, tributyl borate, trihexyl borate, trihexylene glycol biborate, and tri (m, p) cresyl borate with a chloride of a metal selected from the group consisting drous chloride of a metal selected from the group consisting of Ti (IV), Zr (IV), Hf (IV), Sn (IV), Al (III), Fe (III), Mo (V), Nb (V), Ta (V), and W (VI), in a molar ratio of at least about 0.33 mole of trimethoxyboroxine for each mole of the chloride of the selected metal in an inert substantially anhydrous diluent, permitting the chloride of the selected metal to react with trimethoxyboroxine at a temperature between room temperature and about 200° C. until the reaction mixture ceases to give off organic chloride thereby forming a liquor comprising said diluent and a compound of complex chemical structure comprising the selected metal, boron, carbon, hydrogen, chlorine, and oxygen.

2. The method as claimed by claim 1 wherein said diluent is selected from the group consisting of the trimethoxyboroxine, methylene chloride, chloroform, and carbon tetrachloride.

3. A compound of complex chemical structure produced by the method as claimed by claim 1 after removal of volatile material.

4. A solution of the compound claimed by claim 3 in a solvent selected from the group consisting of water, methylene chloride, chloroform, carbon tetrachloride, acetone, and glycol ethers.

References Cited

UNITED STATES PATENTS 2,312,208  2/1943  Clayton et al. ____ 260—429 XR
2,346,155  4/1944  Denison et al. ____ 260—429 XR

OTHER REFERENCES

Steinberg et al., Organoboron Chemistry, John Wiley & Sons, New York, vol. 1, p. 460 (1964).

TOBIAS E. LEVOW, Primary Examiner

H. M. S. SNEED, Assistant Examiner

U.S. Cl. X.R.

260—429.3, 429.5, 429.7, 448, 439, 446; 117—126